United States Patent
Miyata

[11] Patent Number: 6,024,196
[45] Date of Patent: Feb. 15, 2000

[54] ONE-WAY CLUTCH

[75] Inventor: Hirofumi Miyata, Kobe, Japan

[73] Assignee: Bando Chemical Industries, Ltd., Kobe, Japan

[21] Appl. No.: 09/320,699

[22] Filed: May 27, 1999

Related U.S. Application Data

[62] Division of application No. 09/111,776, Jul. 8, 1998.

[30] Foreign Application Priority Data

Jul. 11, 1997  [JP]  Japan ................................. 9-186906

[51] Int. Cl.$^7$ ............................. F16D 41/20; F16D 13/06
[52] U.S. Cl. ........................................ 192/41 R; 192/80
[58] Field of Search .................... 192/41 R, 80, 192/107 T; 188/82.1, 82.6

[56] References Cited

U.S. PATENT DOCUMENTS

| | | | |
|---|---|---|---|
| 2,630,298 | 3/1953 | Hoehn | 188/82.6 X |
| 5,878,855 | 3/1999 | Miyata | 192/41 R |

*Primary Examiner*—Richard M. Lorence
*Attorney, Agent, or Firm*—Sixbey Friedman Leedom & Ferguson; Thomas W. Cole

[57] ABSTRACT

A flat belt 6 is wound around between an annular friction surface 2 at a periphery of a first rotatable member 1 and an arc-like friction surface 4 of a rocking portion 3 of a second rotatable member 5 which is relatively rotatably supported on the first rotatable member 2, and an initial tension is applied to the flat belt 6. With relative rotation movement between the rotatable members 1 and 5 in a locking or free direction, the rocking portion 3 is rocked around a rocking axis Q by the flat belt 6. By virtue of such rocking movement of the rocking portion 3, the tension of the flat belt 6 is increased up to a higher value than the initial tension or decreased down to a lower value than the initial tension. This permits connection or disconnection of the transmission of torque between the rotatable members 1 and 5 in dependence on the relative rotational direction of the rotatable members 1 and 5. The present invention provides a novel one-way clutch simple in structure, not calling for high precision components, less likely to fail to operate properly due to an excessive input torque, requiring only replacement of components even when failing to operate properly, capable of variation in maximum transmission torque, and low in cost.

6 Claims, 10 Drawing Sheets

LOCKING DIRECTION          FREE DIRECTION

ONE-WAY CLUTCH

This application is a Division of application Ser. No. 09/111,776, filed Jul. 8, 1998.

BACKGROUND OF THE INVENTION

1. Field of the Invention

The present invention relates to one-way clutches simple in structure, not calling for high precision components, and low in production cost.

2. Related Background Art

Various one-way clutches have been known in the art, finding applications in the field of automobile, in the field of agricultural machinery, and in the field of office automation equipment. Typical one-way clutches are roller and sprag one-way clutches.

An example of the conventional roller one-way clutches is now described. FIG. 10 is a schematic of a roller one-way clutch which comprises an inner race a, an outer race b relatively rotatably assembled to the inner race a, a plurality of concave recesses c which are formed on the inner periphery of the outer race b such that the concave recesses a are circumferentially spaced at predetermined pitch intervals (note that only one concave recesses c is shown in FIG. 10), a plurality of rollers d accommodated within the corresponding concave recesses c, and a spring (not shown in the figure) operable to energize the rollers d in such a direction (the counterclockwise (energizing) direction in FIG. 10) as to cause the rollers d to be caught between an outer peripheral surface e of the inner race a and an inner peripheral surface f of the outer race b.

When torque is applied to the inner race a in a direction opposite to the foregoing energizing direction (i.e., the clockwise direction in FIG. 10), the rollers d are not caught between the inner race a and the outer race b, and the inner race a is free to rotate independently of the outer race b. In other words, no torque is transmitted from the inner race a to the outer race b, as a result of which the outer race b makes no rotation. On the other hand, when torque is applied to the inner race a in the same direction as the energizing direction in which the rollers d are caught between the inner race a and the outer race b. As a result, the inter race a and the outer race b are locked together by wedging action. The input torque to the inner race a is transmitted to the outer race b. The outer race b starts rotating with the inner race a.

The above-described one-way clutch however has some drawbacks. One problem is that such a roller one-way clutch is costly because it requires high precision components and is complicated in structure.

Another problem is that if a torque in excess of the maximum transmission torque is applied to a one-way clutch, this causes severe damage to the clutch. Such damage cannot be restored by replacing components and the defective clutch must be replaced with a new one. Accordingly, in order to avoid such an incident, the provision of a torque limiter is required. The one-way clutch becomes more costly.

The maximum transmission torque cannot be changed. Accordingly, when an excessive torque is input, the input torque is output intact if it is smaller than the maximum transmission torque. It is also necessary to provide a torque limiter.

Accordingly, an object of the present invention is to provide a novel one-way clutch simple in structure, not calling for high precision components, less likely to fail to operate properly due to an excessive input torque, requiring only replacement of components even when failing to operate properly, capable of variation in maximum transmission torque, and low in cost, through the use of an improved technical structure for a belt transmission mechanism between two shafts.

SUMMARY OF THE INVENTION

Based on the appreciation of the following knowledge, the present invention was made. In a belt transmission mechanism, as the tension of a transmission belt wound around between input and output shafts increases the maximum transmission torque between the input and output shafts likewise increases, and when the transmission belt tension decreases, there occurs slippage between the transmission belt and the input and output shafts. In accordance with the present invention, the tension of a friction member such as a belt is controlled (tensioned up to a higher value or detensioned down to a lower value) according to the rotational direction of input torque and the function of a one-way clutch is achieved.

The present invention provides a first one-way clutch (a first invention) comprising:

(a) a first rotatable member having at a periphery thereof an annular friction surface coaxial with a rotational axis of said first rotatable member;

(b) a second rotatable member;
said second rotatable member being assembled to said first rotatable member so that said second rotatable member can relatively rotate around said rotational axis in a locking direction or in a free direction with respect to said first rotatable member;
said second rotatable member having a rocking portion rockable around a rocking axis running parallel with said rotational axis; and
said rocking portion having an arc-like friction surface lying radially outwardly of said friction surface of said first rotatable member; and (c) an endless friction member;
said endless friction member being wound around between said friction surface of said first rotatable member and said friction surface of said rocking portion; and
the tension of said endless friction member being adjusted according to the rocking movement of said rocking portion;

wherein:
said friction member is given an initial tension so that said rocking portion rocks according to the relative rotational direction of said first rotatable member and said second rotatable member;
when both said first and second rotatable members rotate relatively to each other in said locking direction, said rocking portion turns in such a direction as to tension said friction member up to a higher value than said initial tension; and
when both said first and second rotatable members rotate relatively to each other in said free direction, said rocking portion turns in such a direction as to detension said friction member down to a lower value than said initial tension.

An aspect of the above-described one-way clutch structure is as follows. Input of a torque to one of the first and second rotatable members in the one-way clutch of the present invention causes these rotatable members to rotate relatively to each other in the locking direction or in the free direction. The friction member has already been given an initial tension, because of which grip force is secured between the friction surface of the first rotatable member and the friction surface of the rocking portion of the second rotatable member. The foregoing torque is about to be transmitted to the other rotatable member through the friction member and the rocking portion correspondingly turns around the rocking axis.

When both the first and second rotatable members rotate relatively to each other in the locking direction, the rocking portion turns in such a direction as to tension the friction member up to a higher value than the initial tension. A tension in excess of the initial tension is created in the friction member and the grip force between the friction member and each of the friction surfaces increases. The input torque S is transferred between the first and second rotatable members thereby increasing the maximum transmission torque between the first and second rotatable members. In other words, the oneway clutch enters the locked state.

If settings are made such that when the rate of the occurrence of slippage between the friction member and each of the friction surfaces increases with increasing the input torque and the input torque reaches a given value, the slippage occurrence rate abruptly increases to 100%, then only an approximately constant torque will be transmitted between the first and second rotatable members. This enables the one-way clutch of the present embodiment to function as a torque limiter for excessive input torques.

On the other hand, when both the first and second rotatable members rotate relatively to each other in the freewheel direction, the rocking portion turns in such a direction as to detension the friction member down to a lower value than the initial tension. As the tension of the friction member decreases, the grip force between the friction member and each friction surface likewise decreases. There is performed no torque transmission between the first and second rotatable members. In other words, the one-way clutch of the present invention enters the freewheel state.

A variation to the above-described one-way clutch of the present invention (a second invention) can be made in which:

said friction surface of said rocking portion comprises a free side friction subsurface lying on the side of one circumferential end thereof with respect to said rocking axis and a locking side friction subsurface lying on the side of the other circumferential end, said free side friction subsurface being set longer in length than said locking side friction subsurface;

when both said first and second rotatable members rotate relatively to each other in said locking direction, said rocking portion turns so that said locking side friction subsurface moves in a first direction to press said locking side friction subsurface against said friction member thereby tensioning said friction member up to a higher value than said initial tension; and when both said first and second rotatable members rotate relatively to each other in said free direction, said rocking portion turns so that said locking side friction subsurface moves in a second direction opposite to said first direction thereby detensioning said friction member down to a lower value than said initial tension.

An aspect of the above-described variation is as follows. When both the first and second rotatable members rotate relatively to each other in the locking direction, the rocking portion turns so that the locking side friction subsurface moves in a first direction to cause the locking side friction subsurface to press the friction member thereby tensioning the friction member up to a higher value than the initial tension. On the other hand, when both the first and second rotatable members rotate relatively to each other in the free direction, the rocking portion turns so that the locking side friction subsurface moves in a second direction opposite to the first direction, i.e., in such a direction as to cause the free side friction subsurface to press the friction member. The length of the free side friction subsurface falls below that of the locking side friction subsurface. The degree of increase in the tension of the friction member caused by contact with the free side friction subsurface is smaller than the degree of decrease in the tension of the friction member caused by separation from the locking side friction subsurface. The tension of the friction member is therefore decreased as a whole. The structure of the present invention can be embodied properly.

A variation to the above-described one-way clutch of the present invention (a third invention) can be made in which when both said first and second rotatable members rotate relatively to each other in said locking direction to cause said rocking portion to turn for a given amount of turning movement so that said locking side friction subsurface moves in said first direction, said rocking portion is restricted in making further turning movements beyond said given amount.

An aspect of the above-described variation is as follows. When both the first and second rotatable members rotate relatively to each other in the locking direction thereby to cause the rocking portion to turn so that the locking side friction subsurface of the rocking portion moves in such a direction as to press the friction member, the tension of the friction member increases according to the turning movement of the rocking portion. At the same time, the maximum transmission torque between the first and second rotatable members increases. When the amount of turning movement of the rocking portion in the foregoing direction reaches a given value, a portion corresponding to the free side friction subsurface of the rocking portion is fastened on the friction surface of the first rotatable member. As a result of such arrangement, the rocking portion is restricted in making further turning movements, therefore preventing the maximum transmission torque from exceeding a certain value. Inconveniences due to continuos increase in the maximum transmission torque, such as early deterioration of friction members due to excessive load thereto, can be prevented.

A variation to the above-described one-way clutch of the present invention (a fourth invention) can be made in which said second rotatable member is provided at an input side of said one-way clutch and wherein at least said locking side friction subsurface of said rocking portion is made to press said friction member by centrifugal force produced by rotation of said second rotatable member so that said friction member is given an initial tension.

An aspect of the above-described variation is as follows. The second rotatable member is disposed at the input side of the one-way clutch of the present invention, which means that the second rotatable member is always driven to rotate, regardless of the relative rotational direction of the first and second rotatable members. A portion corresponding to at least the locking side friction subsurface of the rocking portion is radially outwardly displaced by centrifugal force produced by rotation of the second rotatable member. For instance, if the rocking axis of the rocking portion is unable to move radially, then the rocking portion turns so that the foregoing corresponding portion is displaced radially outwardly by the centrifugal force, for the length of the free side friction subsurface is longer than that of the locking side friction subsurface. On the other-hand, if the rocking axis of the rocking portion is not fixed with respect to the second rotatable member and can make a radial displacement, then portions respectively corresponding to the locking side friction subsurface and the free side friction subsurface of the rocking portion (i.e., the entire rocking portion) are moved radially outwardly by the foregoing centrifugal force. By virtue of such a displacement of the rocking portion, the friction member is given an initial tension. This makes it easy to provide an initial tension applicator for applying an initial tension to the friction member.

A variation to the above-described one-way clutch of the present invention (a fifth invention) can be made in which said rocking portion is energized by an energizing member to turn so as to press said locking side friction subsurface against said friction member so that said friction member is given an initial tension.

An aspect of the above-described variation is as follows. The rocking portion is energized by the energizing member to turn so as to cause the locking side friction subsurface to move in such a direction as to press the friction member and the friction member is given an initial tension by being pressed against the locking side friction subsurface. This also makes it easy to provide an initial tension applicator for applying an initial tension to the friction member.

A variation to the above-described one-way clutch of the present invention (a sixth invention) can be made in which said energizing member is disposed so as to press said free side friction subsurface through said friction member to energize said rocking portion to turn while being in slide contact with said friction member on said free side friction subsurface of said rocking portion.

An aspect of the above-described variation is as follows. By virtue of the action of the energizing member, the free side friction subsurface of the rocking portion is pressed through the friction member and the rocking portion is energized to turn so as to press the locking side friction subsurface against the friction member. When both the first and second rotatable members rotate relatively to each other in the free direction thereby placing the one-way clutch of the present invention in the freewheel state, the tension of the friction member decreases and the grip force between the friction member and each of the friction surfaces of the first rotatable member and the rocking portion of the second rotatable member decreases. This is the situation that slippage is likely to occur between the friction member and each friction surface. However, the friction member is, at this time, receiving pressing force from the energizing member at the locking side friction subsurface of the rocking portion, therefore preventing slippage from occurring between the friction surface of the rocking portion and the friction member. Slippage occurs only between the friction surface of the first rotatable member and the friction member.

A variation to the above-described one-way clutch of the present invention (a seventh invention) can be made in which the coefficient of friction between said friction surface of said rocking portion and said friction member falls below the coefficient of friction between said friction surface of said first rotatable member and said friction member.

An aspect of the above-described variation is as follows. When both the first and second rotatable members rotate relatively to each other in the locking direction thereby placing the one-way clutch of the present invention in the locked state and the amount of torque transmitted between the first and second rotatable members reaches its maximum value, there occurs slippage between the friction member and either one of the friction surface of the first rotatable member and the friction surface of the rocking portion. Slippage is more likely to occur between the friction surface of the rocking portion and the friction member than between the friction surface of the first rotatable member and the friction member. Therefore, slippage occurs only between the friction surface of the rocking portion of the second rotatable member and the friction member. In other words, slippage occurs between the friction surface of the first rotatable member and the friction member when both the first and second rotatable members rotate relatively to each other in the free direction thereby placing the one-way clutch of the present invention in the free state. On the other hand, slippage occurs between the friction surface of the rocking portion of the second rotatable member and the friction member when both the first and second rotatable members rotate relatively to each other in the locking direction thereby placing the one-way clutch of the present invention in the locked state and the amount of torque transmitted between the first and second rotatable members reaches its maximum value. With the switching of the rotational direction of input torque, the friction member moves in circulation fashion between the first rotatable member and the rocking portion of the second rotatable member. This prevents the friction member from locally being deteriorated thereby making the service life of the one-way clutch longer.

The present invention provides a second one-way clutch (an eighth invention) comprising:

(a) a first rotatable member having at a periphery thereof an annular friction surface coaxial with a rotational axis of said first rotatable member;

(b) a second rotatable member;
   said second rotatable member being assembled to said first rotatable member so that said second rotatable member can relatively rotate around said rotational axis in a locking direction or in a free direction with respect to said first rotatable member; and
   said second rotatable member having a rocking portion rockable around a rocking axis running parallel with said rotational axis; and (c) a friction member;
   said friction member being wound around between said friction surface of said first rotatable member and said rocking portion;
   said friction member being fastened to said rocking portion; and
   the tension of said friction member being adjusted according to rocking movement of said rocking portion;
   wherein:
      said friction member is given an initial tension so that said rocking portion rocks according to the relative rotational direction of said first and second rotatable members;
      when both said first and second rotatable members rotate relatively to each other in said locking direction, said rocking portion turns in such a direction as to tension said friction member up to a higher value than said initial tension; and
      when both said first and second rotatable members rotate relatively to each other in said free direction, said rocking portion turns in such a direction as to detension said friction member down to a lower value than said initial tension.

An aspect of the above-described one-way clutch of the present invention is as follows. Unlike the first one-way clutch, in the second one-way clutch the friction member is fastened to the rocking portion of the second rotatable member so that the friction member and the second rotatable member rotate together as one body without slippage therebetween. Connection and disconnection of the transmission of torque is carried out only between the friction member and the friction surface of the first rotatable member. The same operation and effects as the first one-way clutch are obtained in the second one-way clutch.

A variation to the above-described one-way clutch of the present invention (a ninth invention) can be made wherein:

said rocking portion comprises a free side subportion lying on the side of one circumferential end thereof with respect to said rocking axis and a locking side subportion lying on the side of the other circumferential end, said free side subportion being set longer in length than said locking side subportion;

when both said first and second rotatable members rotate relatively to each other in said locking direction, said rocking portion turns so that said locking side subportion moves in a first direction to press said locking side subportion against said friction member thereby tensioning said friction member up to a higher value than said initial tension; and when both said first and second rotatable members relatively rotate in said free direction, said rocking portion turns so that said locking side subportion moves in a second direction opposite to said first direction thereby detensioning said friction member down to a lower value than said initial tension.

An aspect of the above-described variation is as follows. When both the first and second rotatable members rotate relatively to each other in the locking direction, the rocking portion turns so that the locking side subportion at the other circumferential end thereof moves in a first direction to cause the locking side subportion to press the friction member thereby tensioning the friction member up to a higher value than the initial tension. On the other hand, when both the first and second rotatable members rotate relatively to each other in the free direction, the rocking portion turns so that the locking side subportion moves in a second direction opposite to the first direction, i.e., in such a direction as to cause the free side subportion to press the friction member. The length of the free side subportion falls below that of the locking side subportion. The degree of increase in the tension of the friction member caused by contact with the free side subportion is smaller than the degree of decrease in the tension of the friction member caused by separation from the locking side subportion. The tension of the friction member is decreased as a whole. The same operation and effects as the second invention can be obtained.

A variation of the above-described one-way clutch of the prevent invention (a tenth invention) can be made in which when both said first and second rotatable members rotate relatively to each other in said locking direction to cause said rocking portion to turn for a given amount of turning movement so that said locking side subportion moves in said first direction, said rocking portion is restricted in making further turning movements beyond said given amount.

An aspect of the above-described variation is as follows. As in the third invention, when both the first and second rotatable members rotate relatively to each other in the locking direction to cause the rocking portion to turn so that the locking side subportion of the rocking portion moves in such a direction as to press the friction member, the rocking portion is restricted in making further turning movements beyond the given amount, therefore preventing the maximum transmission torque from increasing. Inconveniences, such as early deterioration of friction members due to excessive load, can be prevented.

A variation to the above-described one-way clutch of the present invention (an eleventh invention) can be made in which said second rotatable member is provided at an input side of said one-way clutch and wherein at least said locking side subportion of said rocking portion presses said friction member by centrifugal force produced by rotation of said second rotatable member so that said friction member is given an initial tension.

An aspect of the above-described variation is as follows. Also in this invention, it is easy to obtain the foregoing initial tension applicator.

A variation to the above-described one-way clutch of the present invention (a twelfth invention) can be made in which said rocking portion is energized by an energizing member to turn so as to press said locking side subportion against said friction member so that said friction member is given an initial tension.

An aspect of the above-described variation is as follows. Also in this invention, it is easy to obtain the foregoing initial tension applicator.

A variation to the above-described one-way clutch of the present invention according to the first or eighth invention (a thirteenth invention) can be made in which said second rotatable member has a supporting wall extending parallel with said rotational axis of said first rotatable member and said rocking portion is supported rockably but circumferentially nonmovably on said supporting wall.

An aspect of the above-described variation is as follows. The rocking portion is supported rockably but circumferentially nonmovably on a supporting wall extending parallel with the rotational axis of said first rotatable member. Even when a tension of the friction member is applied to the rocking portion, no moment which causes the rocking axis of the rocking portion to incline is applied to the rocking portion. Deformation caused by such moment can be avoided. This makes it possible to form a rocking portion resistant to deformation through the use of an inexpensive, relatively thin metal plate by a bending process with press means.

A variation to the above-described one-way clutch of the present invention (a fourteenth invention) can be made in which said second rotatable member has a pair of sidewalls lying face to face on both sides of said rocking portion with respect to said rocking axis and said rocking portion is supported rockably between said pair of sidewalls.

An aspect of the above-described variation is as follows. The rocking portion is supported rockably between the sidewalls of the second rotatable member lying face to face at the both sides of the rocking portion with respect to said rocking axis. The same operation and effects as the foregoing invention can be obtained.

A variation to the above-described one-way clutch of the present invention (a fifteenth invention) can be made in which a wheel for power transmission is detachably mounted on either one of said pair of sidewalls of said second rotatable member.

An aspect of the above-described variation is as follows. A power transmission wheel is detachably mounted on one of the sidewalls of the second rotatable member. This transmission wheel can be any type of transmission wheel according to an input or output portion of a drive mechanism driveably connected to the second rotatable member. The flexibility of use of the one-way clutch of the present embodiment can be improved. Reductions in the production cost can be achieved.

A variation to the above-described one-way clutch of the present invention can be made in which said second rotatable member is relatively rotatably assembled to said first rotatable member through a bearing and wherein said bearing is disposed on a plane that passes through said friction member.

An aspect of the above-described variation is as follows. When relatively rotatably assembling the second rotatable member to the first rotatable member through a bearing, moment, created by the tension of the friction member, is not applied to the bearing, for the bearing is on a plane passing through the friction member. In respect of the number of bearings required, this variation compares favorably with a case in which two bearing are disposed in parallel to oppose to the moment, in other words the present variation requires a less number of bearings. This provides reductions of the load applied to the bearing by the moment.

A variation to the above-described one-way clutch of the eighth invention (a seventeenth invention) can be made wherein said friction member has an intermediate portion which is wound around said friction surface of said first rotatable member and end portions which are fastened to said rocking portion.

An aspect of the above-described variation is as follows. The same operation and effects as the eighth invention can be obtained while employing a friction member with ends.

PREFERRED EMBODIMENTS OF THE INVENTION

Figure 1:
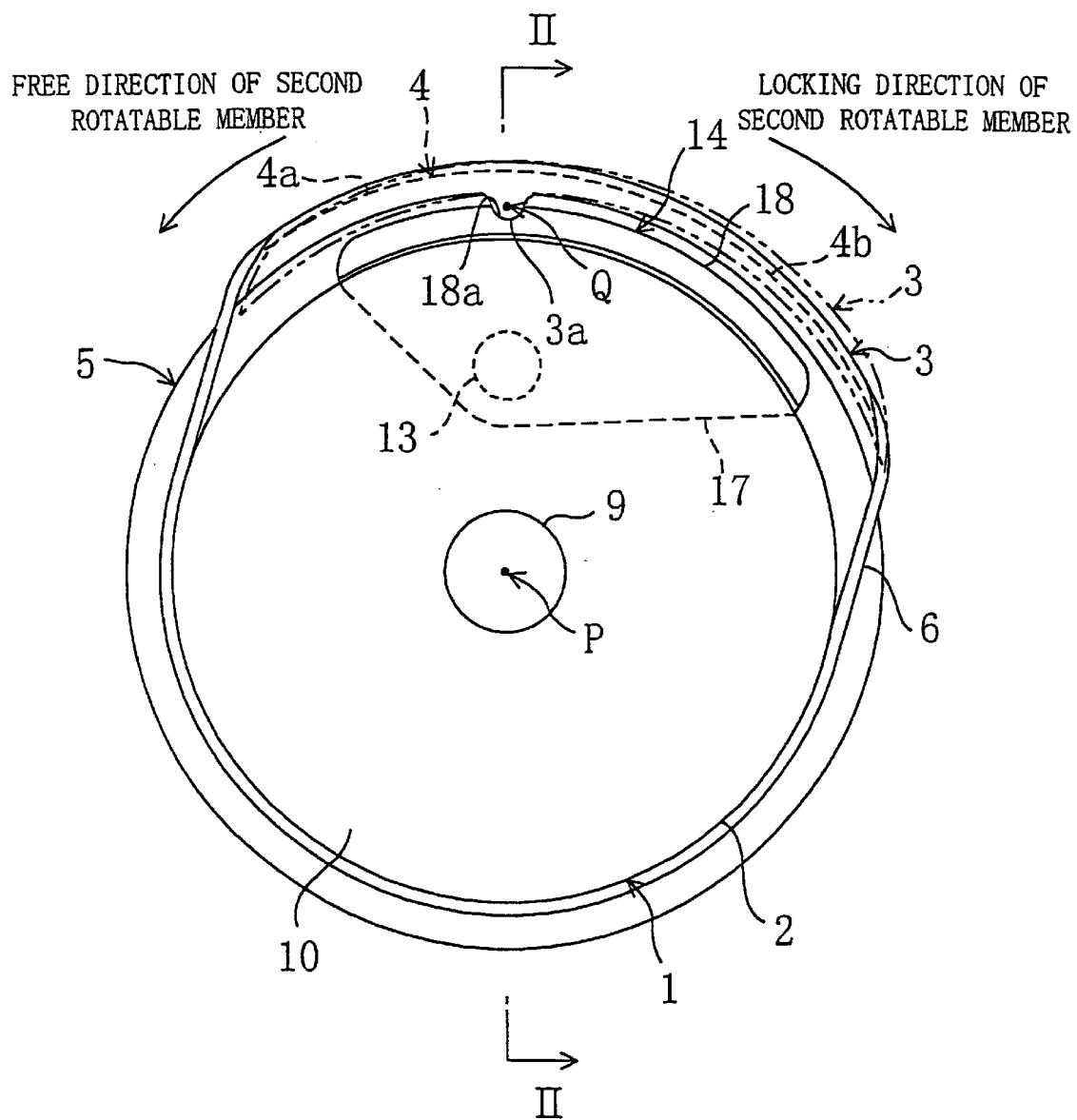
FIG. 1 is a front view of a one-way clutch in accordance with a first embodiment of the present invention.

One-way clutches in accordance with embodiments of the present invention will be described in detail with reference to the attached drawings. Throughout the drawings, like portions are designated by like reference characters and numerals.

FIRST EMBODIMENT

Figure 2:
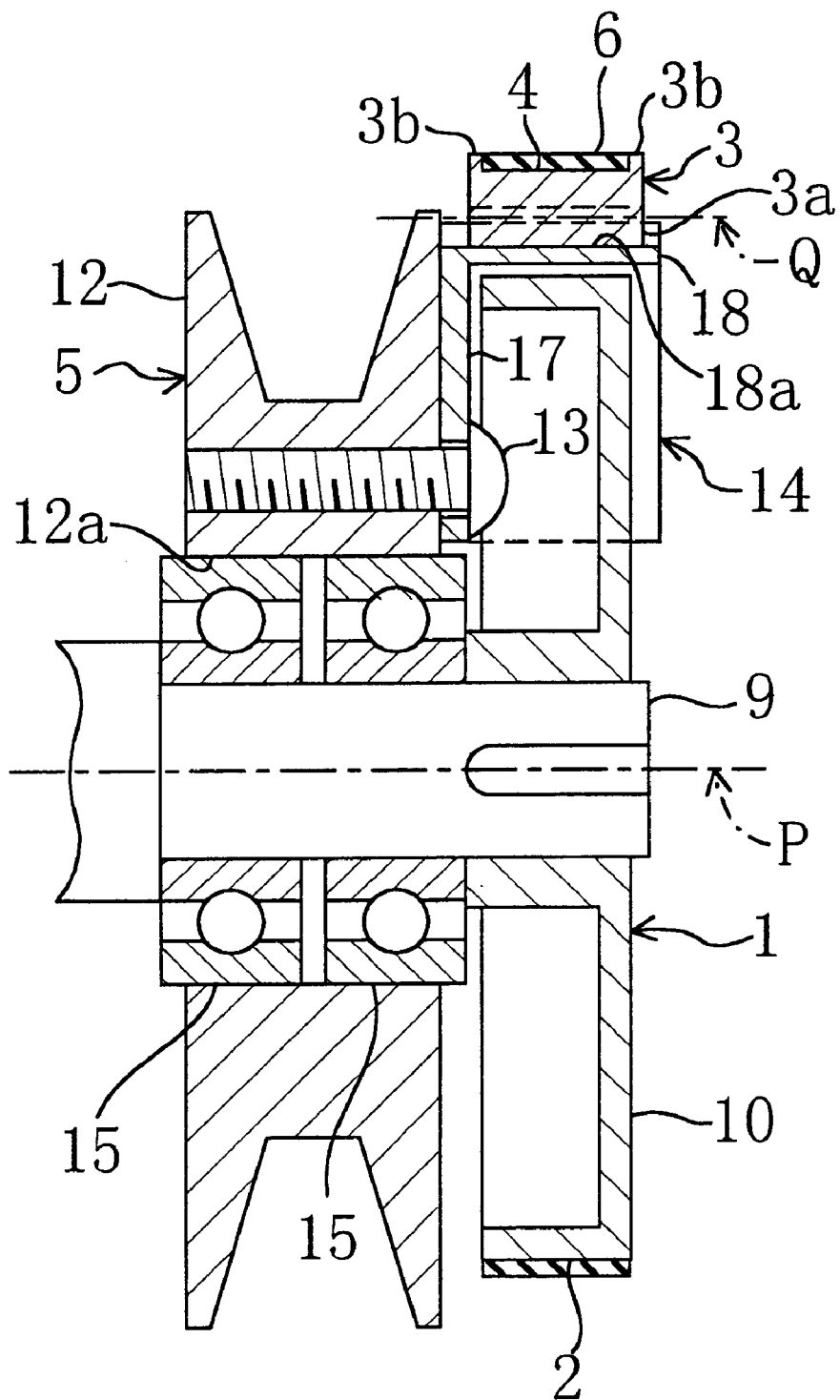
FIG. 2 is a cross-sectional view taken through line II—II of FIG. 1.

Referring to FIGS. 1 and 2, a one-way clutch in accordance with a first embodiment of the present invention is described. The one-way clutch of the first embodiment finds applications in the following fields. For instance, the one-way clutch of the first embodiment can be disposed at the output end of a power takeoff (PTO) device of a vehicle. The one-way clutch of the first embodiment is applicable to agricultural machinery. For example, the one-way clutch of the first embodiment can be disposed at the input end of a reaping mechanism portion of a combine harvester. The one-way clutch of the first embodiment can be disposed also at the input end of a transplanting mechanism portion of a rice transplanter.

The one-way clutch of the first embodiment comprises a first rotatable member 1, a second rotatable member 5, a flat belt 6 of rubber, and an initial tension applying means. The first rotatable member 1 is rotatable around a rotational axis P and has on its outer periphery an annular friction surface 2 coaxial with the rotational axis P. The second rotatable member 5 is assembled to the first rotatable member 1 so that the second rotatable member 5 rotates relatively to the first rotatable member 1 around the rotational axis P in a locking direction (the clockwise direction in FIG. 1) or in a free (freewheel) direction (the counterclockwise direction). The second rotatable member 5 has a rocking portion 3 rockable around a rocking axis Q extending parallel with the rotational axis P. Formed at the outer periphery of the rocking portion 3 and positioned radially outwardly of the friction surface 2 of the first rotatable member 1 is a friction surface 4 shaped like a circular arc. The rubber flat belt 6 is wound around between the friction surface 2 of the first rotatable member 1 and the friction surface 4 of the rocking portion 3 of the second rotatable member 5 and acts as an endless friction member. The tension of the flat belt 6 is increased or decreased by the rocking movement of the rocking portion 3. The initial tension applicator means applies an Initial tension to the flat belt 6 so that the rocking portion 3 rocks according to the relative rotational direction of the first and second rotatable members 1 and 5.

The above is described in a more concrete way. The first rotatable member 1 has a shaft 9 operable as an output member which rotates around the rotational axis P and a flat pulley 10 which is attached to one end of the shaft 9 (the right-hand end of the shaft 9 in the figure) to rotate together with the S shaft 9 as one body. The shaft 9 can be used as an input member. Formed on the outer peripheral surface of the flat pulley 10 is the friction surface 2.

The second rotatable member 5 has a V-pulley 12 operable as an input member and an auxiliary member 14 which is attached by a bolt 13 to one end surface of the V-pulley 12 (the right-hand end surface of the V-pulley 12 in FIG. 2) so that the auxiliary member 14 can rotate together with the V-pulley 12 as one body. The V-pulley 12 can be used as an output member. The V-pulley 12 is assembled relatively rotatably to the shaft 9 of the first rotatable member 1 through two ball bearings 15 and 15 that are disposed so as to line up in the direction of the rotational axis P between a boss hole 12a of the V-pulley 12 and the shaft 9.

The auxiliary member 14 comprises a mounting portion 17 and a supporting wall 18. The mounting portion 17 is formed of a plate shaped like a sector of a circle and is joined at its center portion to the end surface of the V-pulley 12 with the bolt 13. The supporting wall 18 is a plate shaped like a circular arch. Projecting along and parallel with the rotational axis P, the supporting wall 18 circumferentially extends from an outer peripheral portion of the flat pulley 10 positioned radially outwardly of the friction surface 2 in the mounting art 17 so as to cover the friction surface 2. Formed in a portion of the outer periphery of the supporting wall 18 positioned nearer to one end of the supporting wall 18 (the left-hand end in FIG. 1) than to the other end with respect to the circumferential center thereof is a concave groove 18a shaped like a semicircle in cross section. The concave groove 18a extends along the rocking axis Q and in parallel with the rotational axis P.

The rocking portion 3, which is a plate shaped like an circular arch, has inter and outer peripheries which are circular arc surfaces. Formed in a corresponding portion of the inner periphery of the rocking portion 3 to the rocking axis Q is an elongated convex projection 3a shaped like a semicircle in cross section. The elongated convex projection 3a acts as a shaft portion and extends in the crosswise direction of the rocking portion 3. The elongated convex projection 3a is rockably fit into the concave groove 18a of the supporting wall 18. The rocking portion 3 is fastened rockably around the rocking axis Q but circumferentially nonmovably onto an outer peripheral surface of the supporting wall 18. In other words, the rocking portion 3 is restricted such that it rotates with the supporting wall 18 as one body, but it can be displaced radially externally of the supporting wall 18.

The elongated convex projection 3a (the rocking axis Q), which is formed at the inner periphery of the rocking portion 3, lies nearer to one end of the rocking portion 3 (the left-hand end in FIG. 1) than to the other end. The friction surface 4 of the outer periphery of the rocking portion 3 has a free side friction subsurface 4a lying on the side of one circumferential end of the rocking portion 3 with respect to the rocking axis Q (the left-hand side in FIG. 1) and a locking side friction subsurface 4b lying on the side of the other circumferential end (the right-hand side in FIG. 1). As a result of such arrangement, the length of the free side friction subsurface 4a falls below that of the locking side friction subsurface 4b. When the first and second rotatable members 1 and 5 rotate relatively to each other in the locking direction (in other words, when the second rotatable member 5 makes relative rotation in the clockwise direction in the figure with respect to the first-rotatable member 1), the rocking portion 3 turns counterclockwise around the rocking axis Q so that the locking side friction subsurface 4b moves in such a direction (a first direction) as to press the flat belt 6 as shown by the imaginary line of FIG. 1, whereby the flat belt 6 can be tensioned up to a higher value than the initial tension. On the other hand, when the first and second rotatable members 1 and 5 rotate relatively to each other in the free direction (in other words, when the second rotatable member 5 relatively rotates in the counterclockwise direction in the figure with respect to the first rotatable member 1), the rocking portion 3 turns clockwise around the rocking axis Q so that the locking side friction surface 4b moves in a second direction opposite to the first direction, whereby the flat belt 6 can be detensioned (decreased in tension) down to a lower value than the initial tension.

A pair of restriction walls 3b for restricting the crosswise movement of the flat belt 6 are circumferentially formed, in a face-to-face manner as well as in a projecting manner, all along both edges of the friction surface 4 with respect to the direction of the rocking axis Q. The restriction walls 3b prevent the flat belt 6 from creeping to one side. Each of the circumferential ends of the friction surface 4 is formed into a circular arc at a lower bending rate in comparison with the other intermediate portions for the avoidance of the flat belt 6 locally being bent at the ends of the friction surface 4 and for providing smooth guidance of the flat belt 6 with respect to the friction surface 4.

In the present embodiment, the foregoing initial tension applicator means is implemented by the rocking portion 3 of the second rotatable member 5 disposed at the input side of the one-way clutch. The initial tension applicator means applies an initial tension to the flat belt 6 as follows. The rocking portion 3 is displaced radially outwardly by centrifugal force generated with rotation of the input-side second rotatable member 5 so as to press the flat belt 6. In this way, the initial tension applicator means applies an initial tension to the flat belt 6.

The operation of the one-way clutch of the present embodiment is now described. Upon the receipt of torque, the input-side second rotatable member 5 starts rotating in the locking direction or in the free direction. With the rotation of the second rotatable member 5, an initial tension is applied to the flat belt 6. This secures not only grip force between the flat belt 6 and the friction surface 2 of the first rotatable member 1 but also grip force between the flat belt 6 and the friction surface 4 of the rocking portion 3 of the second rotatable member 5. The input torque, which was applied to the second rotatable member 5, is about to move by way of the flat belt 6 to the first rotatable member 1. Meanwhile, the rocking portion 3 of the second rotatable member 5 turns around the rocking axis Q.

When the second rotatable member 5 relatively rotates in the locking direction (the clockwise direction in FIG. 1) with respect to the first rotatable member 1, the rocking portion 3 turns in such a direction (the counterclockwise direction in FIG. 1) as to tension the flat belt 6 up to a higher value than the initial tension, as shown by the imaginary line of FIG. 1. As a result, there is generated a tension in the flat belt 6 exceeding the initial tension. Both the grip force between the flat belt 6 and the friction surface 2 and the grip force between the flat belt 6 and the friction surface 4 are increased. This ensures that the transmission of torque between the first rotatable member 1 and the second rotatable member 5 is satisfactory carried out and the maximum transmission torque (i.e., the maximum amount of torque that is transmitted between the members 1 and 5) increases. In other words, the one-way clutch enters the locked state.

If settings are made such that when the rate of the occurrence of slippage between the flat belt 6 and each of the friction surfaces 2 and 4 increases with increasing the input torque and the input torque reaches a given value, the slippage occurrence rate abruptly increases to 100%, then only an approximately constant torque will be transmitted between the first and second rotatable members 1 and 5. Such arrangements enable the one-way clutch of the present embodiment to function as a torque limiter capable of providing a constant torque even when excessive torque is input.

On the other hand, when the second rotatable member 5 relatively rotates in the free direction opposite to the locking direction with respect to the first rotatable member 1 (the counterclockwise direction in FIG. 1), the rocking portion 3 turns in such a direction (the clockwise direction in FIG. 1) as to detension the flat belt 6 down to a lower value than the initial tension. As the tension of the flat belt 6 decreases, both the grip force between the flat belt 6 and the friction surface 2 and the grip force between the flat belt 6 and the friction surface 4 likewise decrease. At this point in time, no torque transmission takes place between the first rotatable member 1 and the second rotatable member 5. In other words, the one-way clutch enters the free state.

In accordance with the one-way clutch of the present embodiment, the flat belt 6 is wound around between the annular friction surface 2 of the first rotatable member 1 and the arc-like friction surface 4 of the rocking portion 3 of the second rotatable member 5. With the relative rotation of the rotatable members 1 and 5, the rocking portion 3 is rocked by the flat belt 6. The flat belt 6 is tensioned to a higher value than the initial tension or detensioned to a lower value than the initial tension by the rocking movement of the rocking portion 3. When both the first and second rotatable members 1 and 5 rotate relatively to each other in the locking direction so that the rocking portion 3 turns in such a direction as to tension the flat belt 6 to a higher value than the initial tension, the first rotatable member 1 and the second rotatable member 5 are locked each other or enter the locked state to rotate as one body. A torque transmission is carried out between the members 1 and 5. On the other hand, when both the first and second rotatable members 1 and 5 rotate relatively to each other in the free direction so that the rocking portion 3 turns in such a direction as to detension the flat belt 6 to a lower value than the initial tension, this brings the first and second rotatable members 1 and 5 into the free state in which the first and second rotatable members 1 and 5 can rotate relatively to each other. No torque transmission is carried out between the first and second rotatable members 1 and 5. The above provides a one-way clutch simple in structure, not calling for high precision components, and low in production cost in comparison with conventional roller and sprag one-way clutches. In accordance with the one-way clutch of the present embodiment, it is possible to provide an increased maximum transmission torque according to the input torque. This provides a reliable way of transmitting torque between the first and second rotatable members 1 and 5. Additionally, the one-way clutch of the present embodiment is operable as a torque limiter capable of transmitting only a fixed amount of torque even when an excessive torque is input. The one-way clutch of the present embodiment is superior in maintainability. For example, when an excessive torque is input causing damage to the flat belt 6, the damage can be restored by replacement of the damaged flat belt 6 with a new one.

In accordance with the one-way clutch of the present embodiment, the second rotatable member 5 is disposed at the input side of the one-way clutch for applying an initial tension to the flat belt 6. This eliminates the necessity of providing a special element used to applying an initial tension to the flat belt 6 such as an energizing element. Reductions in the production cost can be achieved.

The auxiliary member 14, which has the supporting wall 18 projecting between the rocking portion 13 and the friction surface 2 of the first rotatable member 1 in parallel with the rotational axis P of the first rotatable member 1, is mounted on the V-pulley 12 of the second rotatable member 5. The rocking portion 3 is fastened to and supported on the outer peripheral surface of the supporting wall 18 such that the rocking portion 3 is not allowed to make circumferential movement but is allowed to make rocking movement. This provides the advantage that, even when the tension of the flat belt 6 works on the rocking portion 3, no moment that causes the rocking axis Q of the rocking portion 3 to bias is produced and deformation due to such moment can be averted. As a result, the rocking portion 3 low in cost and resistant to deformation can be produced by bending a relatively thin metal plate with a press machine.

SECOND EMBODIMENT

Figure 3:
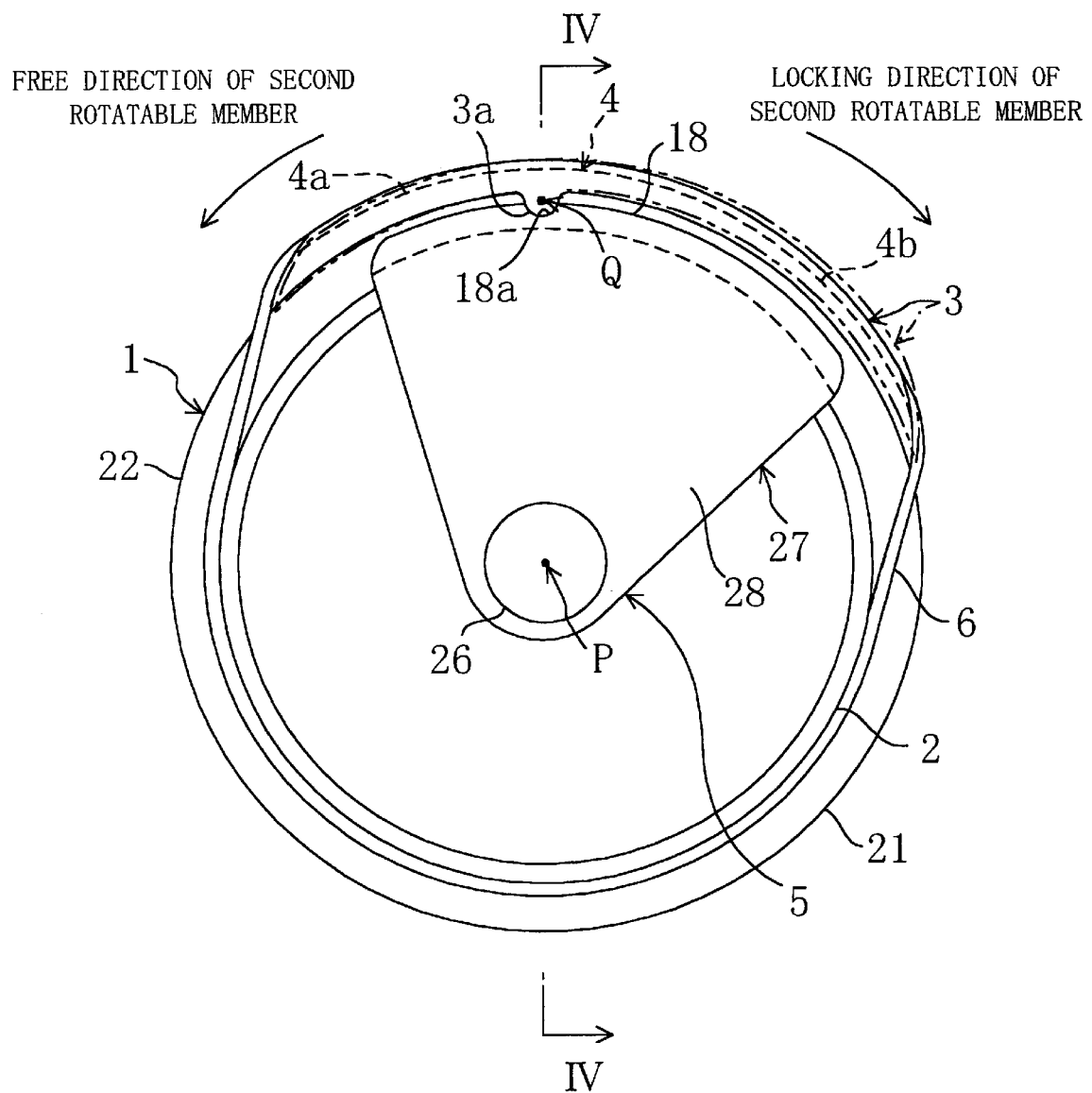
FIG. 3 is a view similar to FIG. 1 and illustrates a one-way clutch in accordance with a second embodiment of the present invention.
Figure 4:
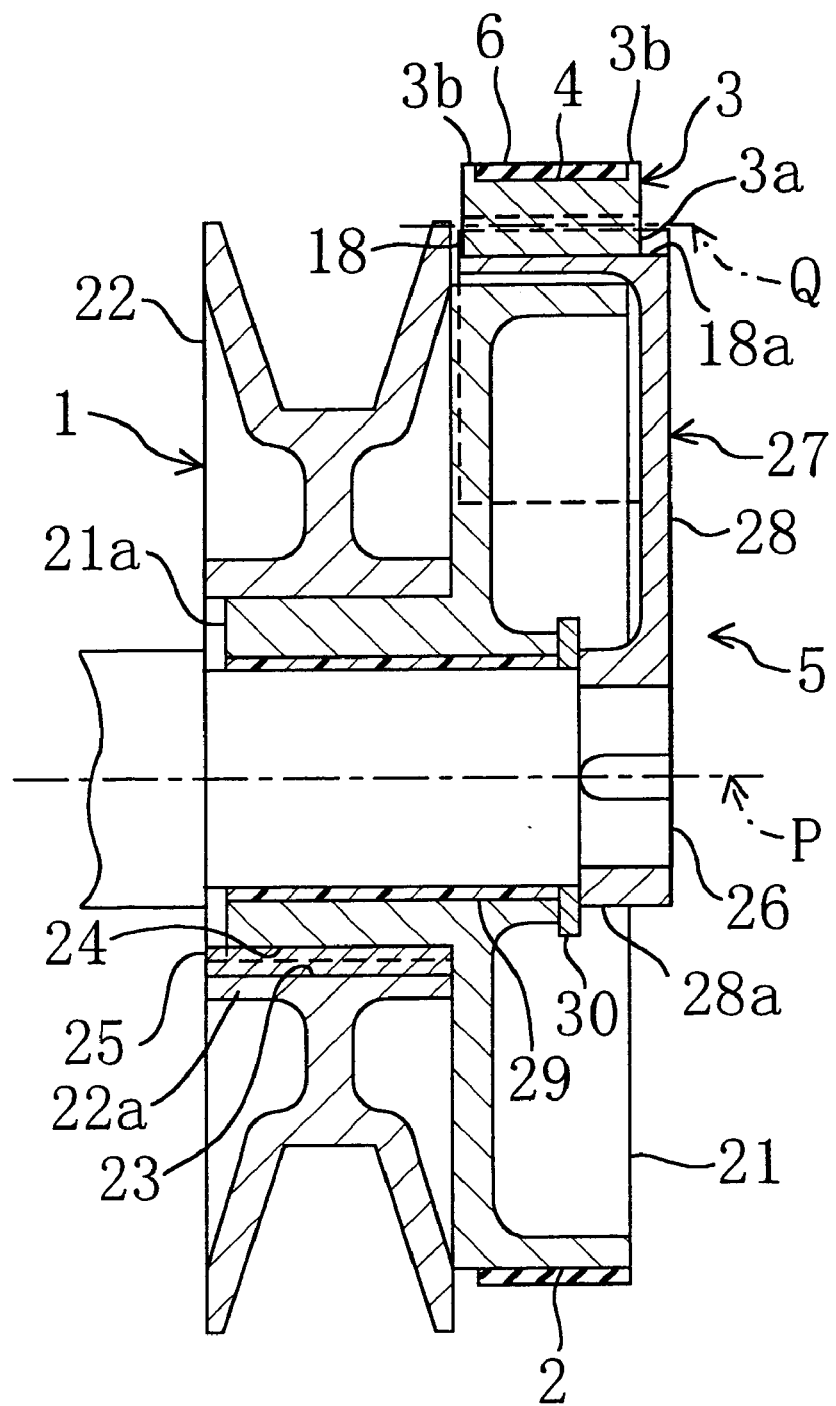
FIG. 4 is a cross-sectional view taken through line IV—IV of FIG. 3.

Referring to FIGS. 3 and 4, the entire structure of a one-way clutch in accordance with a second embodiment of the present invention is now described below.

The first rotatable member 1 of the second embodiment comprises a flat pulley 21 and a V-pulley 22. The flat pulley 21 has at its outer periphery the circular friction surface 2 and a boss portion 21a extending towards the rotational axis P of the first rotatable member 1. The V-pulley 22 as an output member is externally engaged on the boss portion 21a of the flat pulley 21 at a boss portion 22a. The V-pulley 22 can be used as an input member. A key way 24 is formed at the outer periphery of the boss portion 21a of the flat pulley 21. Another key way 23 is positioned and formed at the inter periphery of the boss portion 22a of the V-pulley 22 such that the key way 23 conforms circumferentially to the key way 24 of the flat pulley 21. Each of the key ways 23 and 24 extends along the rotational axis P of the first rotatable member 1. A key 25 is fit into between the key ways 23 and 24 thereby linking together the flat pulley 21 and the V-pulley 22 to rotate as one body.

On the other hand, the second rotatable member 5 of the second embodiment comprises a shaft 26 as an input member which is fit into the boss portion 21a of the flat pulley 21 of the first rotatable member 1, an auxiliary member 27 mounted on one end of the shaft 26 (the right-hand end in FIG. 4) so as to rotate together with the shaft 26 as one body, and the rocking portion 3. Referring to FIG. 4, the auxiliary member 27 has an arm portion 28 attached to the tip of the shaft 26 at the boss portion 28a and extending radially outwardly from the boss portion 28a in an approximately sector form, and the arc-like supporting wall 18 mounted at an outer peripheral portion located radially outwardly of the friction surface 2 of the first rotatable member 1 in the arm portion 28. The second rotatable member 5 is relatively rotatably assembled to the first rotatable member 1 through a bearing member 29 placed between the shaft 26 and the boss portion 21a of the flat pulley 21 of the first rotatable member 1. Placed between the bearing member 29 and the boss portion 21a and the boss portion 28a of the arm portion 28 is a rocking member 30 shaped like a washer.

Like the first embodiment, in the present embodiment the second rotatable member 5 is disposed at the input side of the one-way clutch. An initial tension is applied to the flat belt 6 by the rocking portion 3 which is rocked by centrifugal force. Except for the above, the present embodiment is identical in structure with the first embodiment and will not be described further.

Accordingly, the present embodiment's one-way clutch operates in the same way as the first embodiment's one-way clutch and provides the same effects that the first embodiment's one-way clutch provides.

THIRD EMBODIMENT

Figure 5:
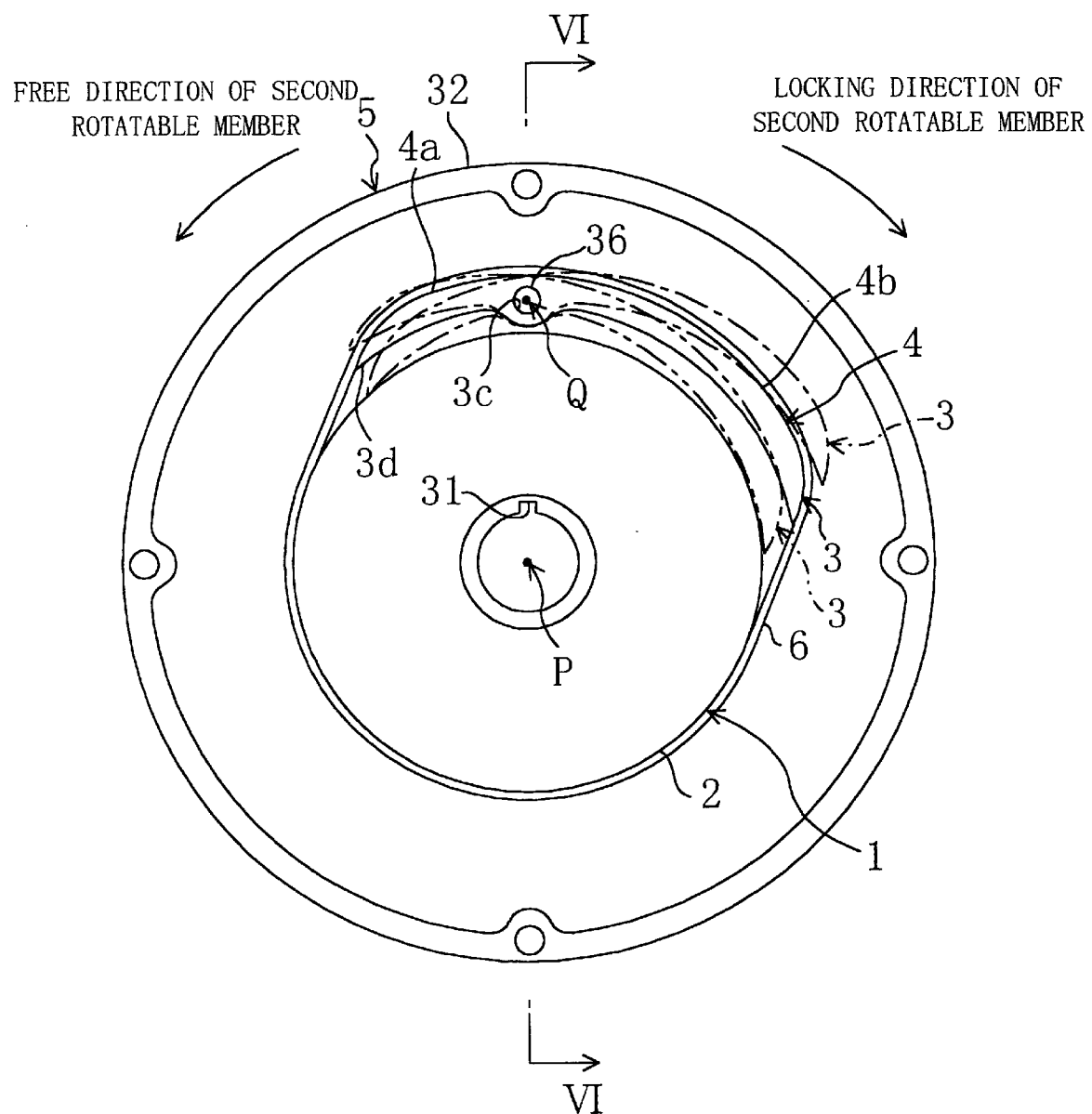
FIG. 5 is a view similar to FIG. 1 and illustrates the internal structure of a one-way clutch with a cover member removed in accordance with a third embodiment of the present invention.
Figure 6:
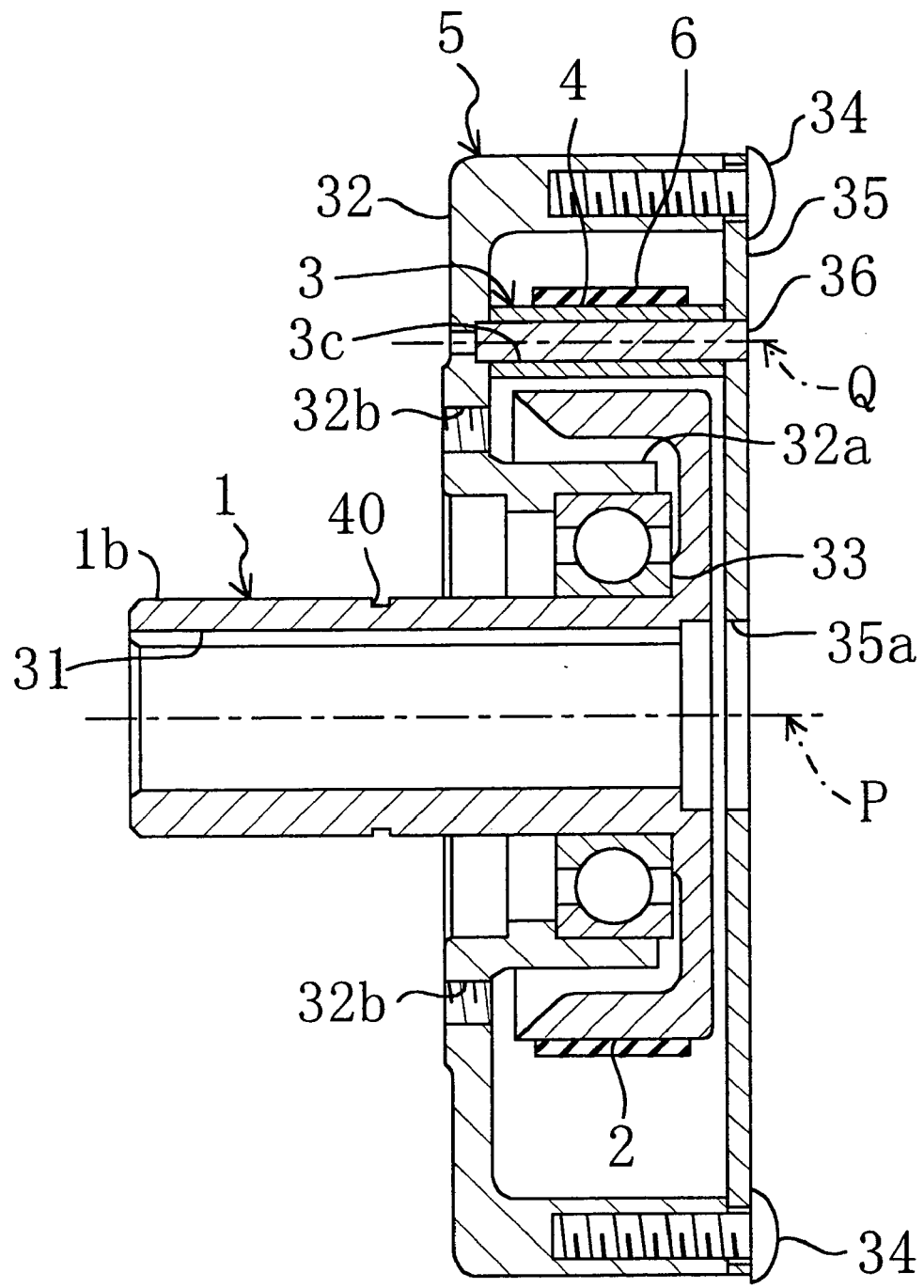
FIG. 6 is a cross-sectional view taken through line VI—VI of FIG. 5.

Referring to FIGS. 5 and 6, the entire structure of a one-way clutch of a third embodiment of the present invention is now described below.

In accordance with the third embodiment of the present invention, the first rotatable member 1 is formed by a flat pulley having at its outer periphery the circular friction surface 2. A boss portion 1b of the first rotatable member 1 is formed so as to project towards the left-hand side of FIG. 6. A key way 31, which is for key coupling to a shaft (not shown in the figure) that is linked to the boss portion 1b, is formed at the inner periphery of the boss portion 1b, extending along the rotational axis P.

On the other hand, the second rotatable member 5 has a body portion 32 shaped like a cup with an opening which is externally engaged on the boss portion 1b of the first rotatable member 1 at a boss portion 32a and which is relatively rotatably assembled to the boss portion 1b through a bearing 33, and a cover member 35 shaped like a disk which is integrally attached to the cup-like body portion 32 with a plurality of bolts 34 so as to cover the opening of the body portion 32. Formed centrally in the cover member 35 is an opening 35a through which to pass the foregoing shaft not shown in the figure. The body portion 32 and the cover member 35 form a pair of sidewalls in the present invention.

Disposed radially outwardly of the friction surface 2 of the flat pulley 1 of the second rotatable member 5 is a rocking shaft 36 for supporting the rocking portion 3 so that rocking portion 3 can rock around the rocking axis Q. The rocking shaft 36 is passed through a shaft hole 3a formed through the rocking portion 3 at the location of the rocking axis Q. Both ends of the rocking shaft 36 are supported at the body portion 32 and at the cover member 35 of the second rotatable member 5 respectively, and the rocking portion 3 is rockably supported by the body portion 32 and the cover member 35. Like the first embodiment, the second rotatable member 5 is disposed at the input side of the one-way clutch so as to apply an initial tension to the flat belt 6 in the present embodiment.

In accordance with the present invention, when the second rotatable member 5 relatively rotates in the locking direction (the clockwise direction in FIG. 5) with respect to the first rotatable member 1 so that the rocking portion 3 rotates for a given amount of rotational movement in such a-direction (the counterclockwise direction in FIG. 5) so as to press the locking side friction subsurface 4b of the friction surface 4 of the rocking portion 3 against the flat belt 6, an end portion 3d corresponding to the free side friction subsurface 4a of the friction surface 4 is brought into contact with the friction surface 2 of the first rotatable member 1. As a result of such arrangement, the rocking portion 3 is restricted in making further rotational movement beyond the foregoing given amount, as shown in the imaginary line of FIG. 5.

In addition to the above, the bearing 33 between the first rotatable member 1 and the second rotatable member 5 is disposed on a plane which passes through the flat belt 6 and which is perpendicular to the rotational axis P, as shown in FIG. 6. This prevents moment, created by the tension of the flat belt 6, from exerting on the bearing 33.

Figure 7:
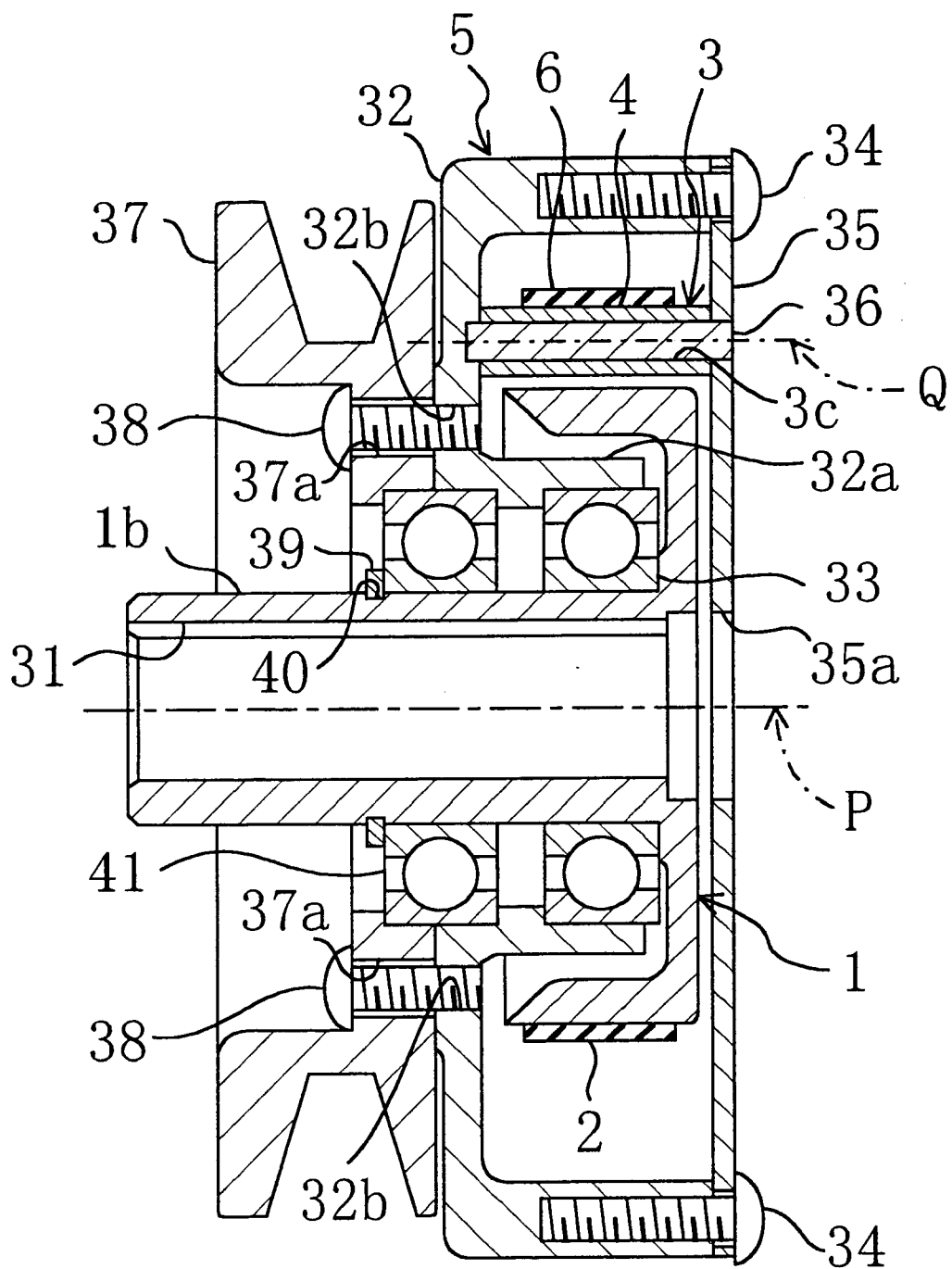
FIG. 7 is a view similar to FIG. 6 and illustrates the third embodiment one-way clutch with a V-pulley mounted thereon.

As can be seen from FIG. 7, a V-pulley 37, as a transmission (input) wheel, is mounted detachably on the body portion 32 (one of the sidewalls) of the second rotatable member 5. In other words, the V-pulley 37 is supported on the boss portion 1b of the first rotatable member 1 through a bearing 41. Formed in a plurality of peripheral portions of the V-pulley 37 are a corresponding number of bolt insertion holes 37a that extend parallel with the rotational axis P. Mounting bolts 38, inserted through the corresponding bolt insertion holes 37a, are threaded into bolt holes 32b formed in peripheral portions of the body portion 32 to link together the V-pulley 37 and the second rotational member 5 so that the V-pulley 37 and the second rotational member 5 rotate as one body.

The bearing 41, which externally engages the boss portion 1b, is for having the boss portion 1b support load applied to the V-pulley 37 in a relatively rotatable manner. A securing groove 40 is formed on the periphery of the boss portion 1b of the first rotatable member 1. A C-ring 39 is fit into the securing groove 40 to secure the bearing 41 in place.

Accordingly, the present embodiment's one-way clutch operates in the same way as the first embodiment's one-way clutch and provides the same effects that the first embodiment's one-way clutch provides. The bearing 33, which is used to relatively rotatably assemble the second rotatable member 5 to the flat pulley 1 (i.e., the first rotatable member 1), is disposed on a plane that passes through the flat belt 6. This prevents moment, created by the tension of the flat belt 6, from exerting on the bearing 33. In respect of the number of bearings required, the present embodiment compares favorably with cases in which two bearing are disposed in parallel to oppose to the moment, in other words the present embodiment requires a less number of bearings. This provides reductions of the load applied to the bearing 33 by the moment.

When the second rotatable member 5 relatively rotates in the locking direction with respect to the first rotatable member 1, the rocking portion 3 is restricted in making further rotational movements beyond a given rotational amount by contact between the end portion 3d of the rocking portion 3 and the friction surface 2 of the first rotatable member 1. This prevents the maximum transmission torque between the first rotatable member 1 and the second rotatable member 5 from increasing. Early deterioration of the flat belt 6 due to excessive load application can be prevented. Inconveniences due to continuos increase in the maximum transmission torque can be prevented.

In accordance with the present embodiment, the V-pulley 37 is detachably attached to the body portion 32 of the second rotatable member 5. This makes ispossible to attach to the body portion 32 a corresponding type of pulley to an output portion of a drive mechanism (not shown in the figure) driveably connected to the second rotatable member 5. The flexibility of use of the one-way clutch of the present embodiment can be improved. Reductions in the production cost can be achieved.

Instead of using the V-pulley 37, it is possible to employ a power transmission wheel such as a gear and a sprocket in the present embodiment. Such a change can be made selectively depending on the type of an output portion of a drive mechanism driveably connected to the second rotatable member 5.

In the present embodiment, the V-pulley 37, as a power transmission wheel, is mounted detachably to the body portion 32 of the second rotation member 5. Such a power transmission wheel can be mounted detachably to the cover member 35 (the other sidewall) or to both of the body portion 32 and the cover member 35.

FOURTH EMBODIMENT

Figure 8:
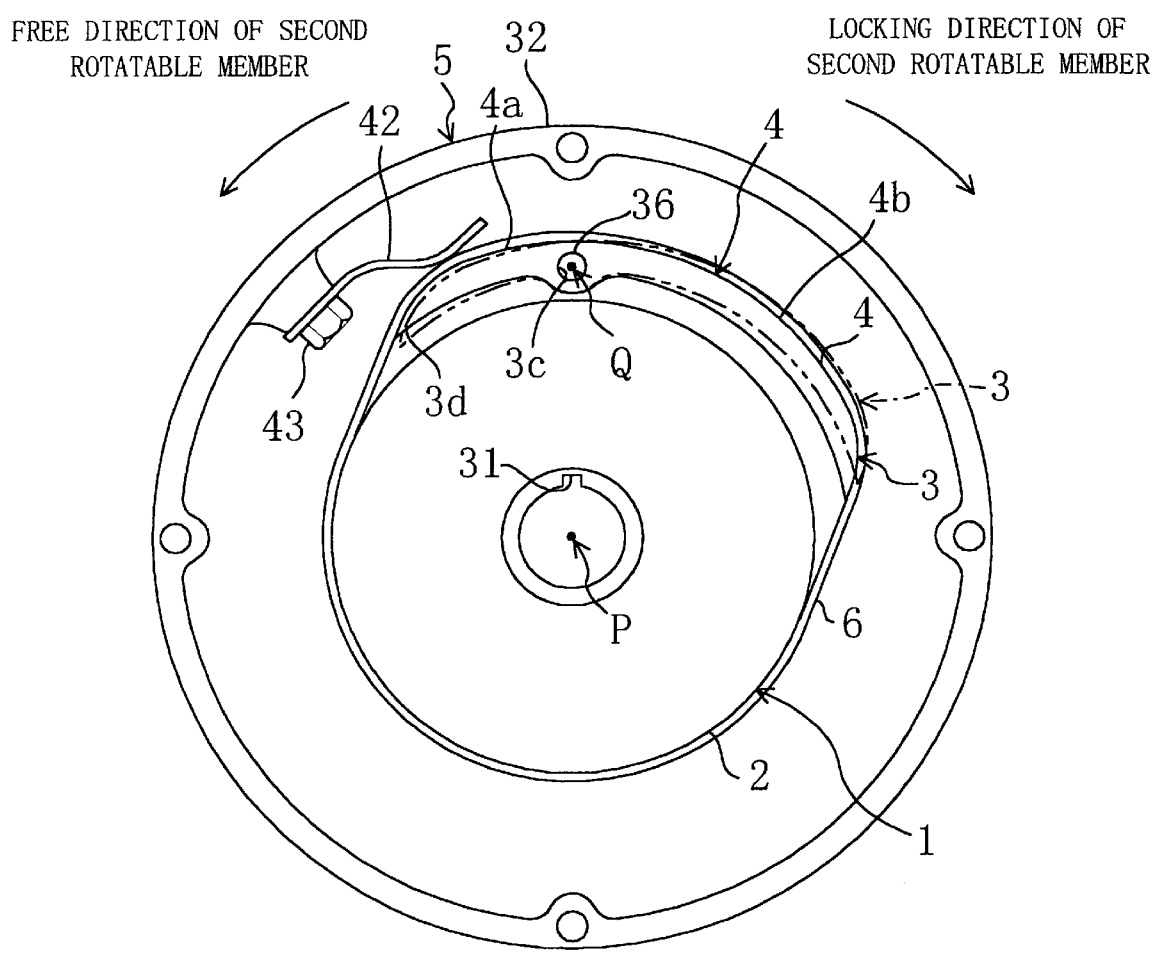
FIG. 8 is a view similar to FIG. 5 and illustrates the internal structure of a one-way clutch in accordance with a fourth embodiment of the present invention.

FIG. 8 shows major portions of a one-way clutch in accordance with a fourth embodiment of the present invention. The one-way clutch of the present embodiment is basically identical in structure with the third embodiment's one-way clutch.

Referring to FIG. 8, the one-way clutch of the present embodiment is provided with an initial tension applicator means that is a flat spring 42 as an energizing member. By virtue of the flat spring 42, the rocking portion 3 is energized to turn so that the locking side friction subsurface 4b of the friction surface 4 moves in such a direction (the counterclockwise direction in FIG. 8) as to press the flat belt 6. The base of the flat spring 42 is rigidly fixed to the inner peripheral surface of the body portion 32 of the second rotatable member 5 with a bolt 43 and the tip end thereof presses the free side friction subsurface 4a of the friction surface 4 of the rocking portion 3 through the flat belt 6 while at the same time being in slide contact with the flat belt 6 on the free side friction subsurface 4a. The rocking portion 3 is energized to turn by pressing force created by the flat spring 42. In other words, the rocking portion 3 is energized by the flat spring 41 to turn, whereby an initial tension can be applied to the flat belt 6. Unlike the first to third embodiments in which the second rotatable member 5 is required to be disposed at the input side of the one-way clutch, any one of the first rotatable member 1 and the second rotatable member 5 can be disposed at the input side of the one-way clutch in the present embodiment.

The coefficient of friction between the friction surface 4 of the rocking portion 3 and the flat belt 6 is less than the coefficient of friction between the friction surface 2 of the first rotatable member 1 and the flat belt 6. In other words, the friction surface 4 of the rocking portion 3 is more likely to slip over the flat belt 6 in comparison with the friction surface 2 of the first rotatable member 1. Except for the above, the present embodiment is identical in structure with the third embodiment and will not be described further.

The operation of the one-way clutch of the present embodiment having the above-described structure, in which the second rotatable member 5 is disposed at the input side of the one-way clutch, is described. When the second rotatable member 5 rotates in the free direction (the-counterclockwise direction in FIG. 8) with respect to the first rotatable member 1 thereby to place the one-way clutch in the free state, the flat belt 6 is detensioned down to a lower value than the initial tension. This results in decreasing both the grip force between the flat belt 6 and the friction surface 2 of the first rotatable member 1 and the grip force between the flat belt 6 and the friction surface 4 of the rocking portion 3 of the second rotatable member 5, and slippage is about to occur between the flat belt 6 and each friction surface 2 and 4. However, at this point in time, the rocking portion 3 is pressed, at the free side friction subsurface 4a of the friction surface 4, by the flat spring 42 through the flat belt 6, as a result of which the rocking portion 3 is energized to turn so that the locking side friction subsurface 4b moves in such a direction so as to press the flat belt 6, and the flat belt 6 receives at the locking side friction subsurface 4b pressing force from the flat spring 42. No slippage occurs between the friction surface 4 and the flat belt 6. Accordingly, slippage occurs, only between the flat belt 6 and the friction surface 2 of the first rotatable member 1, as a result of which the flat belt 6 travels with the second rotatable member 5 in the free direction with respect to the first rotatable member 1.

On the other hand, when the second rotatable member 5 rotates in the locking direction (the clockwise direction in FIG. 8) with respect to the first rotatable member 1 thereby to place the one-way clutch in the locked state and the amount of torque, transmitted between the first and second rotatable members 1 and 5, reaches the maximum transmission torque, slippage occurs either between the flat belt 6 and the friction surface 2 of the first rotatable member 1 or between the flat belt 6 and the friction surface 4 of the rocking portion 3 of the second rotatable member 5. At this time, the friction surface 4 of the rocking portion 3 is more likely to undergo slippage over the flat belt 6 in comparison with the friction surface 2 of the first rotatable member 1. Accordingly, slippage occurs, only between the flat belt 6 and the friction surface 4 of the rocking portion 3 of the second rotatable member 5. The flat belt 6 relatively travels with the first rotatable member 1 in the free direction with respect to the friction surface 4 of the second rotatable member 5.

The flat belt 6 slips only over the friction surface 2 of the first rotatable member 1 when the second rotatable member 5 rotates in the free direction thereby to place the one-way clutch in the free state. On the other hand, the flat belt 6 slips only over the friction surface 4 of the rocking portion 3 of the second rotatable member 5 when the second rotatable member 5 rotates in the locking direction thereby to place the one-way clutch in the locked state. With the switching of the rotational direction of input torque, the flat belt 6 moves in circulation fashion in the free direction of the second rotatable member 5 between the first and second rotatable members 1 and 5. This prevents the flat belt 6 from locally being deteriorated thereby making the service life of the flat belt 6 longer.

In the case the first rotatable member 1 is disposed at the input side of the one-way clutch, the rotation of the first rotatable member 1 is relative to that of the second rotatable member 5 and the rotational direction of each of the first and second rotatable members 1 and 5 is opposite to the above. The description will not be made.

The one-way clutch of the present embodiment operates in substantially the same way as the third embodiment's one-way clutch and provides substantially the same effects as the third embodiment's one-way clutch.

FIFTH EMBODIMENT

Figure 9:
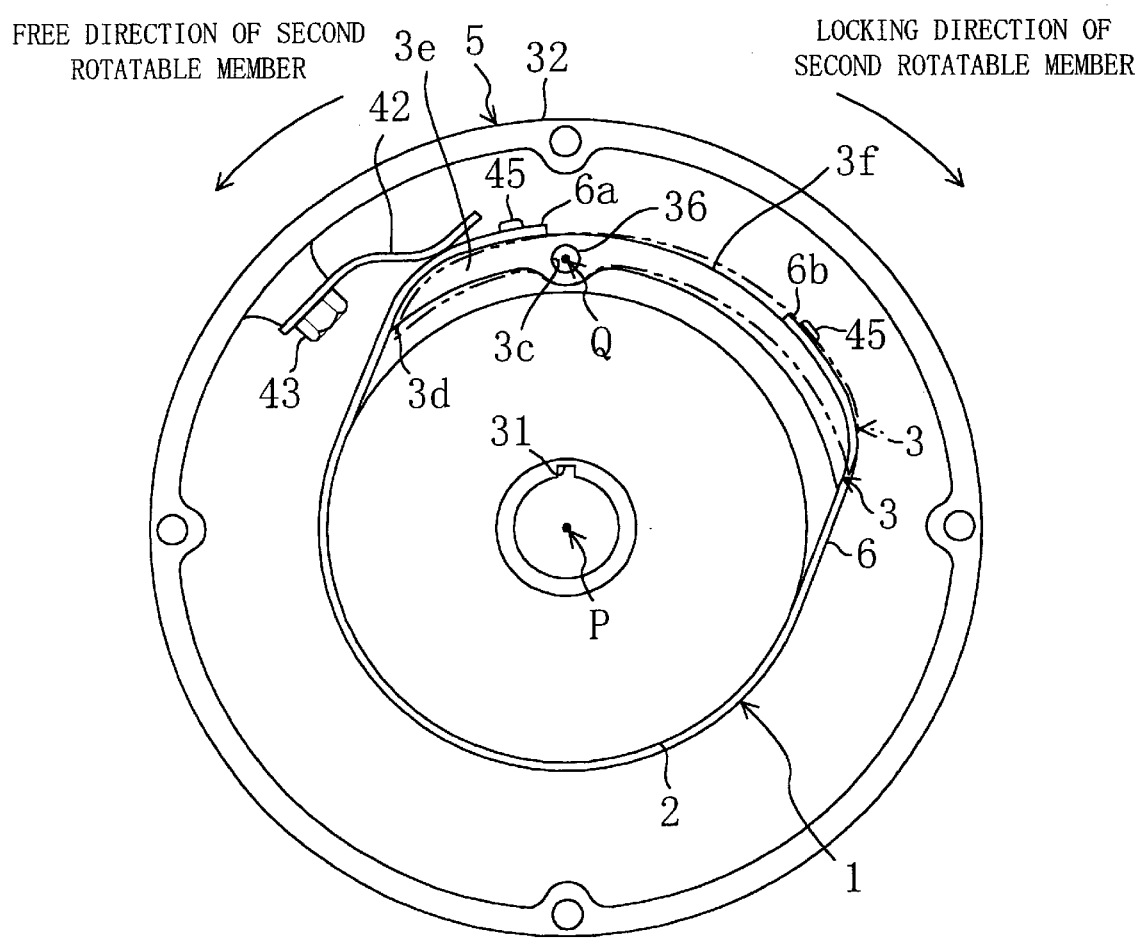
FIG. 9 is a view similar to FIG. 5 and illustrates the internal structure of a one-way clutch in accordance with a fifth embodiment of the present invention.
Figure 10:
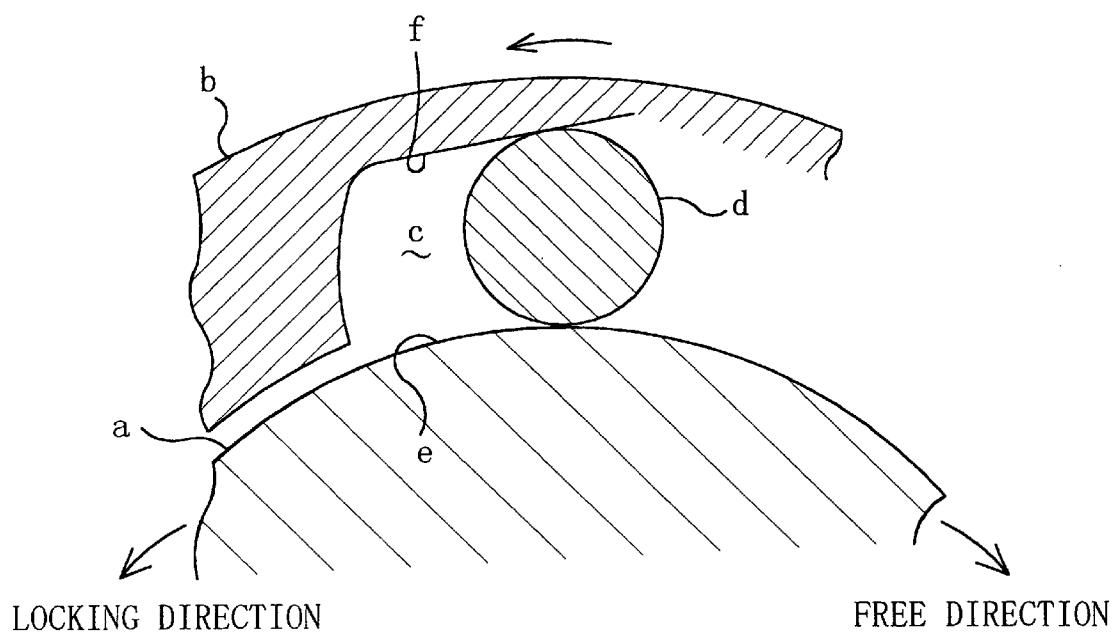
FIG. 10 is an enlarged cross-sectional view schematically showing major portions of a commonly-used roller one-way clutch.

FIG. 9 shows major portions of a one-way clutch in accordance with a fifth embodiment of the present invention. The one-way clutch of the present embodiment is basically identical in structure with the third embodiment's one-way clutch.

The rocking portion 3 of the present embodiment is divided into two portions, namely a free side subportion 3e positioned on the side of one circumferential end of the rocking portion 3 (the left-hand end in FIG. 9) with respect to the rocking axis Q and a locking side subportion 3f positioned on the side of the other circumferential end (the right-hand side). The length of the free side subportion 3e falls below that of the locking side subportion 3f.

The flat belt 6 with ends is used as a friction member. The intermediate portion of the flat belt 6 is wound around the friction surface 2 at the outer periphery of the first rotatable member 1. Both ends of the flat belt 6 are fastened to the outer peripheral surfaces of the fress side subportion 3e and the locking side subportion 3f with screws 45 respectively. When the first and second rotatable members 1 and 5 rotate relatively to each other in the locking direction (the clockwise direction of the second rotatable member 5 in FIG. 9), the rocking portion 3 rotates so that the locking side subportion 3f moves in such a direction (a first direction) as to press the flat belt 6, more specifically in the direction in which an end 6b of the flat belt 6 is pulled and pressed radially outwardly (i.e., the counterclockwise direction in FIG. 9), thereby increasing the tension of the flat belt 6. On the other hand, when the first and second rotatable members 1 and 5 rotate relatively to each in the free direction (the counterclockwise direction of the second rotatable member 5 in FIG. 9), the rocking portion 3 rotates so that the locking side subportion 3f moves in a second direction opposite to the foregoing first direction, more specifically in the direction in which the end 6b of the flat belt 6 is pushed back and pulled radially inwardly (the clockwise direction in FIG. 9) thereby decreasing the tension of the flat belt 6. Except for the above, the present embodiment is identical in structure with the third embodiment and will not be described further.

In accordance with the present embodiment, the ends 6a and 6b of the flat belt 6 are fastened to the free side subportion 3e and to the locking side subportion 3f respectively. Connection and disconnection of the transmission of torque according to the grip force between the flat belt 6 and the friction surface 2 of the first rotatable member 1 is carried out only between the flat belt 6 and the friction surface 2. The one-way clutch of the present embodiment operates in substantially the same way as the third embodiment's one-way clutch and provides substantially the same effects as the third embodiment's one-way clutch.

A variation to the fifth embodiment can be made in which the flat belt 6 is an endless belt as in the third embodiment and part of the flat belt 6 is fastened to the outer periphery of the rocking portion 3 (the portions 3e and 3f or the peripheries of the portions 3e and 3f).

In the first embodiment (see FIGS. 1 and 2) or in the second embodiment (see FIGS. 3 and 4), instead of using the endless flat belt 6, a flat belt with ends can be used and the structure of the fifth embodiment can be employed.

In each of the foregoing embodiments of the present invention, the flat belt 6 as a friction member is formed of rubber. It should be noted that the flat belt 6 is not limited in material and in shape. For example, the flat belt 6 can be formed of metal hoop. The flat belt 6 can be formed of any other friction materials.

What is claimed is:

1. A one-way clutch comprising:

(a) a first rotatable member having at a periphery thereof an annular friction surface coaxial with a rotational axis of said first rotatable member;

(b) a second rotatable member;
   said second rotatable member being assembled to said first rotatable member so that said second rotatable member can relatively rotate around said rotational axis in a locking direction or in a free direction with respect to said first rotatable member; and
   said second rotatable member having a rocking portion rockable around a rocking axis running parallel with said rotational axis; and (c) a friction member;
   said friction member being wound around between said friction surface of said first rotatable member and said rocking portion;
   said friction member being fastened to said rocking portion; and
   the tension of said friction member being adjusted according to rocking movement of said rocking portion;
   wherein:
   said friction member is given an initial tension so that said rocking portion rocks according to the relative rotational direction of said first and second rotatable members;
   when both said first and second rotatable members rotate relatively to each other in said locking direction, said rocking portion turns in such a direction as to tension said friction member up to a higher value than said initial tension; and
   when both said first and second rotatable members rotate relatively to each other in said free direction, said rocking portion turns in such a direction as to detension said friction member down to a lower value than said initial tension.

2. The one-way clutch of claim 1, wherein:
   said rocking portion comprises a free side subportion lying on the side of one circumferential end thereof with respect to said rocking axis and a locking side subportion lying on the side of the other circumferential end, said free side subportion being set longer in length than said locking side subportion;
   when both said first and second rotatable members rotate relatively to each other in said locking direction, said rocking portion turns so that said locking side subportion moves in a first direction to press said locking side subportion against said friction member thereby tensioning said friction member up to a higher value than said initial tension; and
   when both said first and second rotatable members relatively rotate in said free direction, said rocking portion turns so that said locking side subportion moves in a second direction opposite to said first direction thereby detensioning said friction member down to a lower value than said initial tension.

3. The one-way clutch of claim 2, wherein when both said first and second rotatable members rotate relatively to each other in said locking direction to cause said rocking portion to turn for a given amount of turning movement so that said locking side subportion moves in said first direction, said rocking portion is restricted in making further turning movements beyond said given amount.

4. The one-way clutch of claim 2, wherein said second rotatable member is provided at an input side of said one-way clutch and wherein at least said locking side subportion of said rocking portion presses said friction member by centrifugal force produced by rotation of said second rotatable member so that said friction member is given an initial tension.

5. The one-way clutch of claim 2, wherein said rocking portion is energized by an energizing member to turn so as to press said locking side subportion against said friction member so that said friction member is given an initial tension.

6. The one-way clutch of claim 1, wherein said friction member has an intermediate portion which is wound around said friction surface of said first rotatable member and end portions which are fastened to said rocking portion.

* * * * *